United States Patent [19]

Prottengeier

[11] Patent Number: 4,551,965

[45] Date of Patent: Nov. 12, 1985

[54] WELDING AND SEPARATING APPARATUS FOR PLASTIC FILMS

[75] Inventor: Manfred Prottengeier, Norderstedt, Fed. Rep. of Germany

[73] Assignee: Doboy Verpackungsmaschinen GmbH, Schenefeld, Fed. Rep. of Germany

[21] Appl. No.: 597,165

[22] Filed: Apr. 5, 1984

[30] Foreign Application Priority Data

Apr. 6, 1983 [DE] Fed. Rep. of Germany ....... 3312314

[51] Int. Cl.$^4$ ........................................... B65B 51/14
[52] U.S. Cl. ...................................... 53/463; 53/373; 156/164; 156/229; 156/583.3; 156/583.91
[58] Field of Search ................. 53/463, 477, 228, 373; 156/163, 164, 229, 251, 273.7, 380.7, 583.3, 583.91

[56] References Cited

U.S. PATENT DOCUMENTS

| | | | |
|---|---|---|---|
| 3,001,348 | 9/1961 | Rado | 53/373 X |
| 3,050,916 | 8/1962 | Gausman et al. | 53/373 X |
| 3,097,462 | 7/1963 | Langdon | 53/373 X |
| 3,438,173 | 4/1969 | Omori | 53/373 X |
| 3,597,587 | 8/1970 | Baum | 53/373 X |
| 3,846,210 | 11/1974 | Groundwater | 156/583.91 X |
| 4,115,182 | 9/1978 | Wildmoser | 156/583.3 X |
| 4,209,958 | 7/1980 | Bailey | 53/373 X |

FOREIGN PATENT DOCUMENTS 1187980 2/1965 Fed. Rep. of Germany ........ 53/373

*Primary Examiner*—Horace M. Culver
*Attorney, Agent, or Firm*—Trask & Britt

[57] ABSTRACT

A welding and separating device for stacked plastic films has a heated welding and separating strip and a cooperating resilient counterpressure element which are moved together. The strip has a wedge-shaped separating knife with a comparatively small wedge angle and two welding members, one on either side thereof. Each welding member is formed to have a cross sectionally round surface. The welding members and the knife have comparatively deep V-shaped recesses therebetween. The counterpressure element is round in cross section and is aligned opposite the center of the separating knife. Separate spaced support bars press against the counterpressure element to deform the element and tension the films so that the surface of the resilient element is reduced as the knife and welding members press against the element. A process for welding employs support bars and a welding bar. The support bars first deform a resilient counterpressure element and tension films which tension is reduced as the welding bar presses against the resilient element during film welding.

21 Claims, 7 Drawing Figures

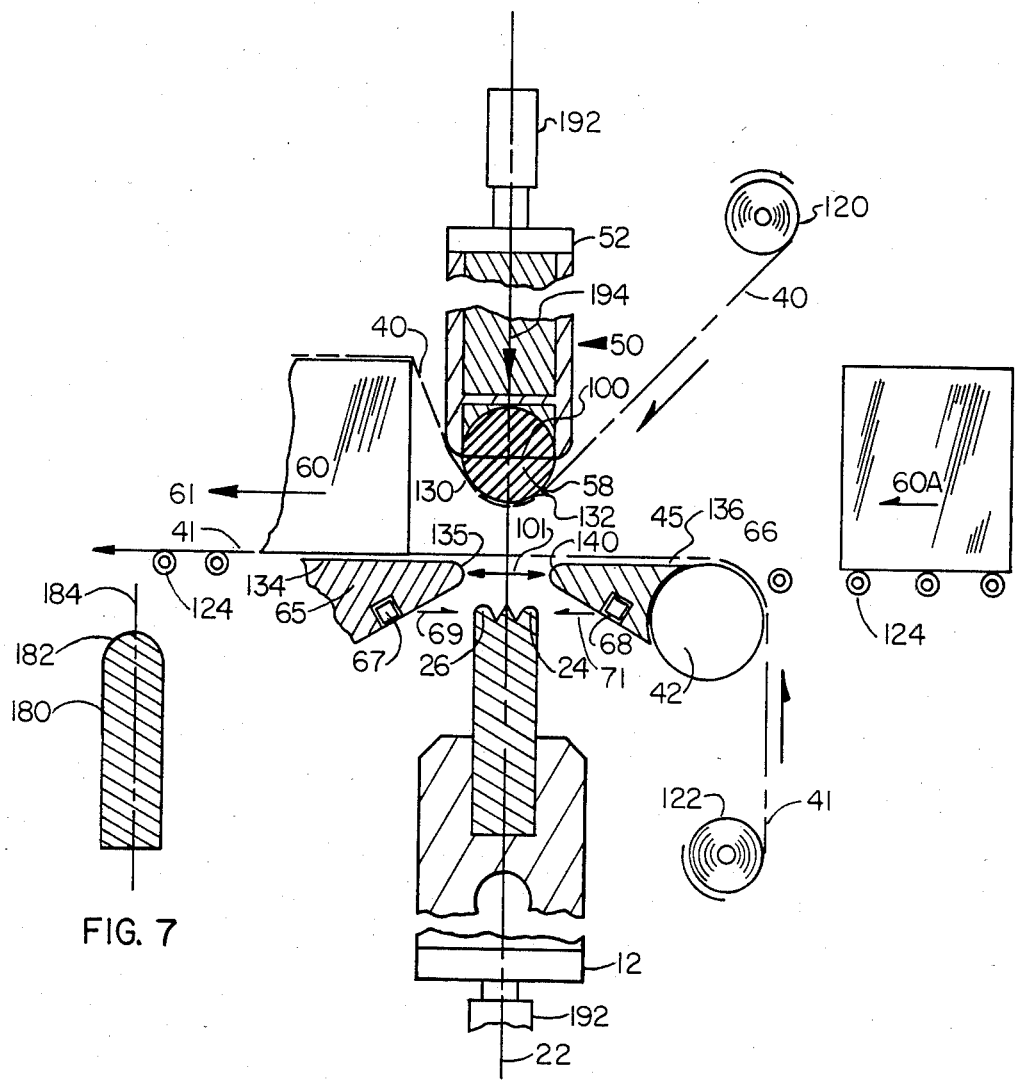
FIG. 7
FIG. 3
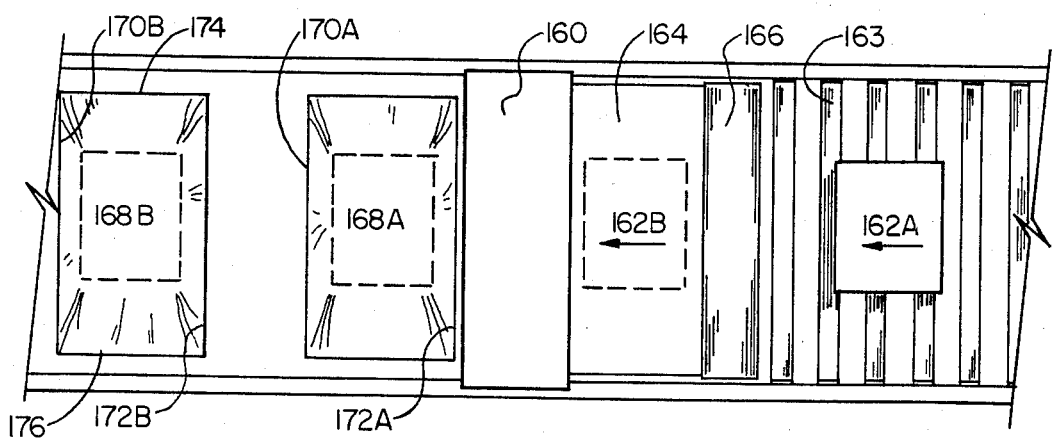
FIG. 6

WELDING AND SEPARATING APPARATUS FOR PLASTIC FILMS

BACKGROUND OF THE INVENTION

The invention pertains to welding and separating devices for stacked plastic films. This invention also relates to a method for welding stacked plastic films. More particularly, the devices include a heated welding bar positioned on one side of the film. The bar carries a welding/separating strip. A counterpressure element is positioned on the other side of the film. The welding-/separating strip, on its side facing the films, has about in the center thereof, a separating knife which is preferably wedge-shaped in cross section. On either side of and at a distance from the knife are welding strips which are preferably shorter than the separating knife. The counterpressure element consists of a springy, resilient material.

Many devices for welding plastic films are known in the form of heated welding strips or welding bars, which press the films against a resilient, flat backing to bring about the weld. If it is desired, as frequently occurs in packaging technology, to separate welded film sections, it is conventional practice to use two parallel and closely adjacent welding strips simultaneously to produce two welding seams, between which the separation then occurs.

For separating, there are also various known alternatives. One of these is a heated separating wire which is pressed through the films. A fixed, heated knife and a moving, cutting knife are also known. Hold-downs for the film are usually employed when knives are used. It is also known, finally, that cutting and welding can be carried out with a single element, namely, a creasing strip or a heated round wire. In this case, it is necessary to be satisfied with a comparatively narrow weld seam and a direct transition from weld seam to separated edge.

In West German Offenlegungsschrift No. DE 28 01 201, published July 19, 1979, for example, one sees a simple welding and separating device appropriate for manual welding. It has a resistor welding strip and a movable pressure bar. The quality of the welding seam and the productivity of devices operating at this level of technology are comparatively low.

Various other types of welding and separating devices are known from British Patent Specification No. 1,273,245; West German Offenlegungsschrift No. 31 41 898, published May 11, 1983; West German Patent No. DE 10 78 318, dated Sept. 22, 1960; and West German registered utility model No. 72 34 088, dated Sept. 15, 1972. The welding and separating devices discussed in these documents reveal varied forms for such devices used in industry, particularly in the packaging industry.

A problem occurring especially at high productivity rates in devices for the simultaneous production of a double seam with a separation occurring between them is the occasional complaints of defective welded seam quality. In particular, this takes the form of an excessive thinning of the material; and ruptures in the material can even occur in the area of the welded seam.

The present invention is based on the task of improving a welding and separating device of the type described above in such a way that the uniformity in quality of the weld seams is greatly improved. This task is solved, according to the invention, in that the longitudinal edge of each welding strip (seen in cross section) facing the counterpressure element is preferably rounded with a radius which is preferably equal to about half the thickness of the welding strip; and in that the surface of the longitudinal edge curved in this way, starting with the outer side of the welding strip, extends essentially in a continuous manner to its meeting point with the preferably lateral wedge surface of the separating knife bordering the welding strip on the inside; in that the line of intersection between the longitudinal curved surface and the wedge surface is about at the height of the center of the curvature of the longitudinal surface or deeper; and in that the counterpressure element (seen in cross section) has an outward-arching surface positioned so that the smallest distance of which to the welding/separating strip is approximately in the center longitudinal plane of the welding/separating strip.

In a preferred arrangement, support bars are positioned between the counterpressure element and the welding strip. As the element and strip move together, the support bars contact the element to deform it to a desired shape and desired degree of deformation (reduced resiliency) to reduce tension in the films as they are separated and welded.

Advantageous embodiments of these solutions are given in the subclaims.

By means of the agencies described, the desired goal is achieved in a manner which is as simple as it is convincing. A welding and separating device designed in accordance with the invention creates seams of uniformly high quality with unexpectedly high service lives for the counterpressure element and the welding-/separating strip even at very high productivities, i.e., at a large number of welds per unit time. It has also been found that, in contrast to the state of the art, it is no longer necessary to match the cutting edge of the separating knife to a hard cutting surface on the surface of the counterpressure element. This cutting surface was a strip of fiberglass, which was glued to the flat surface of the known counterpressure element in the area of the separating knife. The elimination of this strip, which is now possible, has the additional advantage that the known, time-consuming alignment of the separating knife with respect to the narrow strip, which is attendant on tool replacement, is now completely eliminated because, with the counterpressure element having a rounded surface, a rough alignment is completely sufficient.

In addition, it has been found that the gap between the welding strips of the welding/separating bar can be reduced by comparison to the state of the art, and that a much smaller amount of film residue collects than has customarily been the case at the wedge surfaces of the separating knife. The reason for this appears to be that the device according to the invention leads to lower tensile stresses inside the film in the welding and separating area.

In calculating the dimensions of the counterpressure element and the gaps between the welding strips and the separating knife, the goal to be achieved is that the welding strips contact the counterpressure element when they are brought together at a point which is in or near the V-shaped recess in the surface of the counterpressure element brought about by the separating knife. This has the desirable result that a comparatively thin welding/separating strip can be used with the possibility of creating very narrow weld seams. Narrow weld seams make hardly any negative visual impression and, at a width of ½ mm, for example, are in practice just as strong as the seam produced by the usual means with a width of about 5 mm. Narrow weld seams also require a reduced cooling time, which makes it possible to increase productivity. Finally, a welding/separating strip of reduced thickness also means that the gap to be provided for it in the plane of conveyance of packaging machines incorporating the present invention can be correspondingly narrower, so that the movable coverings conventionally used there may frequently be eliminated.

BRIEF DESCRIPTION OF THE DRAWINGS

The invention is explained below on the basis of the exemplary embodiments shown in the following drawings:

FIG. 3 is a partial cross sectional through a preferred alternate embodiment of the invention;

FIG. 6 is a partial simplified view of a packaging machine employing apparatus of the invention; and FIG. 7 is a simplified cross sectional view of a welding means for use in the method of welding of the instant invention.

DESCRIPTION OF THE ILLUSTRATED EMBODIMENTS

Figure 1:
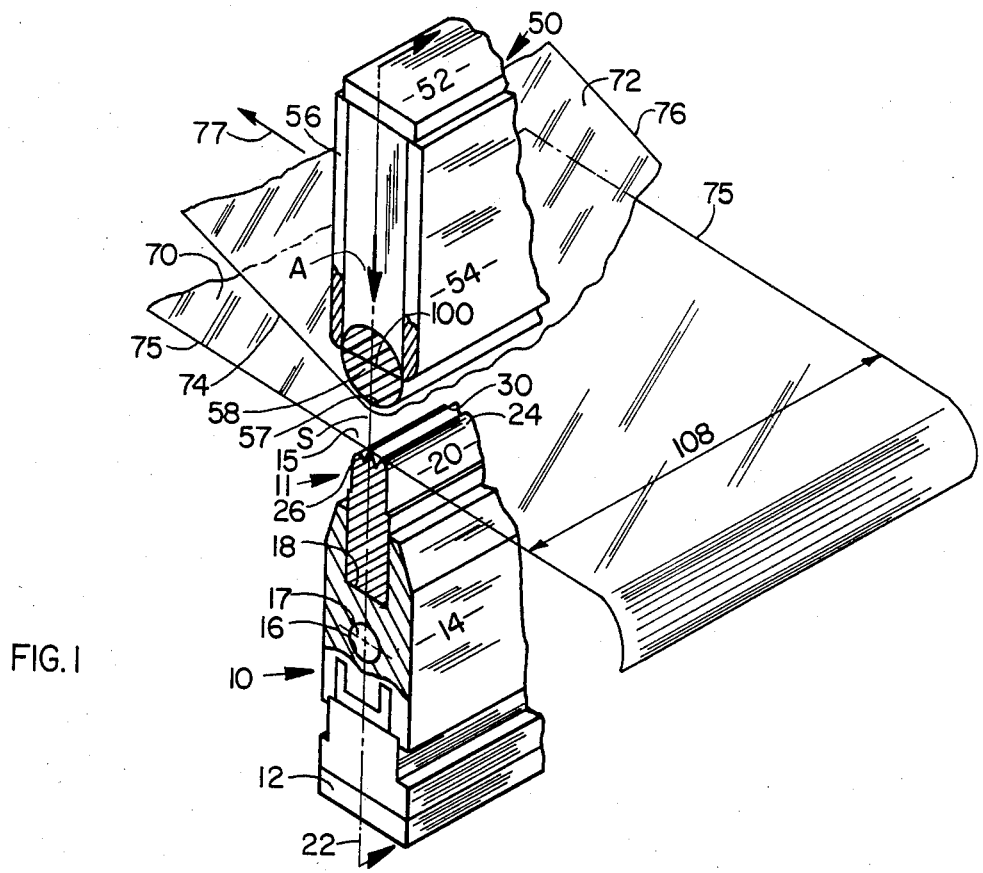
FIG. 1 shows a partial perspective view of a device of the instant invention with a cross section therethrough.

A welding and separating device of the type of interest here for multilayer plastic films has a welding bar 10 in a machine stand (not shown) and a counterpressure bar 50. The two bars 10, 50 are movable with respect to each other. Usually the welding bar 10 is attached immovably in the machine stand and a counterpressure bar 50 or several successive counterpressure bars move one after the other in the direction of the arrow A (FIG. 1) toward the welding bar 10. Other arrangements for moving the bars 10, 50 with respect to each other may be provided, it being necessary only to have the bars 10, 50 come together as more fully discussed hereinafter. Typically, the machine upon which the bars 10, 50 are mounted will provide suitable means for moving either one or both bars 10, 50. Well known hydraulic or mechanical (cam) means are here contemplated, although other methods or means may also be used.

Shortly before the welding process, the welding bar 10 and the counterpressure bar 50 are at a certain distance from each other, so that there is a gap S between them. Through this gap S, the flat surfaces of the superimposed or stacked sheets of plastic films 70, 72 are conducted. Each film has opposite outside edges 73, 74, 75 and 76, as shown.

When the device described is used in a packaging machine, the upper side 11 of the welding bar 10 facing the counterpressure bar 50 is about at the level of the transport plane 15 through the packaging machine. The transport plane 15 is typically a plane in which objects to be wrapped and/or film move. It is typically horizontal.

Along the transport plane 15, a bottom film 70 for the objects to be packaged is conducted; and a top film 72 is laid or stacked on this bottom film 70, so that an object to be packaged is enclosed between the two films. The top and bottom films 70, 72 are welded together in front of and behind the object, frequently, as in the present case, by means of two closely adjacent weld seams extending transversely or crosswise to the feed direction 77 of the films 70, 72 and between which the films are then separated. In operation, the forward weld seam of this double seam, seen in the conveying direction of the films, forms the rear weld of top and bottom films behind an object, and the following seam of the double seam, in the direction of film conveyance, forms the forward weld seam with respect to the following object. The separating cut between the two seams thus represents the separation between successive objects and the separation of the stacked films.

The welding bar 10 is attached to a support structure 12 (not shown), which in turn is connected to the stand of the machine in which the device is to be used. The entire welding bar 10 consists of a metallic member 14, which stands on edge on the support structure 12 and has a longitudinal hole 16 for accepting a heating element. Preferably, an electrical resistive heating element 17 is positioned therein to, in operation, heat strip 20. Along the upper side of the member 14 there is a longitudinal groove 18, in which a metal welding/separating strip 20 is installed, which projects in the direction of the counterpressure bar 50 away from the member 14. The member 14 and the welding/separating strip 20 have a common central longitudinal and transverse plane 22, the location of which is shown in FIG. 1 as a broken line. The member 14 and the strip 20 extend between the opposite side edges 73, 75 and 74, 76 of the respective films 70, 72. The plane 22 is essentially normal to the transport plane 15.

On the side facing the counterpressure bar 50 or on its outward face, the welding/separating strip 20 has two parallel, outside welding members 24 and 26; and in the center between the welding members 24, 26, there is the separating knife 28. The two welding members 24, 26 are preferably shaped and arranged symmetrically with respect to the center longitudinal plane 22. They are, in the concrete or preferred embodiment, an integral component of the welding/separating strip 20; but they can also be designed to be inserted in the strip 20 in a replaceable manner.

Figure 2:
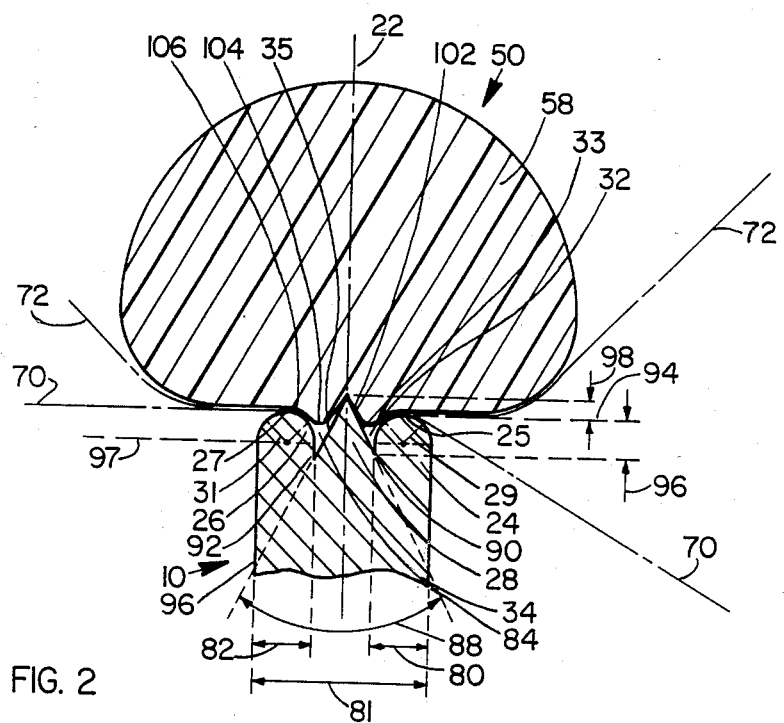
FIG. 2 shows a greatly enlarged cross section through the outermost portion of a welding/separating strip with the counterpressure element in the welding and separating position.

In the cross section of FIG. 2, it can be seen that the welding members 24, 26 have curved surfaces 25, 27 oriented toward the counterpressure bar 50. The curvature is circular in the exemplary embodiment, each with a radius 29, 31 which is about equal to half the thickness 80 or 82 of the respective welding member 24, 26. The surface of the members 24, 26 thus passes from the lateral (outside) surfaces 84, 86 of the welding/separating strip 20 parallel to the center longitudinal plane 22 into a cylindrical surface.

The separating knife 28 is shaped in cross section as a wedge; and its cutting edge 30 is preferably aligned with the center longitudinal plane 22. The wedge angle 88 of the separating knife 28 in the exemplary embodiment is about 30°. FIG. 2 shows that the flat wedge surfaces 33, 35 of the separating knife 28 intersect with the curved surfaces of the welding strips 24, 26 at a line located comparatively deep in the welding/separating strip 20, by which means an approximately V-shaped recess 32, 34 is formed between the welding members 24, 26 and the separating knife 28. The lowest points 90 and 92 of the recesses 32, 34 in the exemplary embodiment, is below the transverse plane 94 tangent to the two free ends of the welding strips by a distance 96 which is about equal to double the above-mentioned radius of curvature 29, 31. Alternatively, the points 90, 92 are at least as deep as the radius 29, 31 as measured from the plane 97. It can also be seen that the curved surfaces 25, 27 of the two welding members 24, 26 are largely continuous up to the intersection with the outer wedge surfaces 33, 35 of the separating knife 28. In a practical concrete example, the radius has a value of about 3 mm. Finally, it can be seen very clearly that the cutting edge 30 of the separating knife 28 projects beyond the highest points of the two welding strips 24, 26 by an amount 98 of about 0.3–0.5 mm in a practical concrete embodiment.

The welding/separating strip 20 in the exemplary embodiment is coated with PTFE over its entire exposed area; the coating in the area of the separating edge 30 of the separating knife 28, however, is removed, by which means the heat transfer to the film and thus the separating speed can be improved.

The counterpressure bar 50 has a support structure consisting of a base plate 52 and two side wall members 54, 56 which hold a counterpressure element 58 on the side facing the welding bar 10 in such a way that at least a large part of this counterpressure element 58 projects downward from the counterpressure bar 50. It can be seen that the counterpressure bar 50 with the counterpressure element 58 is aligned to be in the same center longitudinal plane 22 as the welding bar 10. That is, the outermost point 57 of the element 58 is in alignment with the edge 30 in the plane 22.

The counterpressure element 58 in the exemplary embodiment is made of a cylinder of silicone rubber and is held in such a way between the side walls 54, 56 that half of the cylinder projects toward the welding bar 10. This cylinder is also coated in the exemplary embodiment with a fiberglass/PTFE film. The element is made of resilient material having a preferred Shore hardness of 20-60 (as per West German industry standards). The diameter 100 of the cylinder is about 16–20 mm.

To weld with the device described above, the heating element 17 provided as mentioned above in the longitudinal hole 16 of the strip 14 is put into operation. By means of a regulating device (not shown), the welding-/separating strip 20 is then brought to the desired temperature and held there. With films situated in gap S, the counterpressure bar 50 is pushed downward against the welding bar, so that first the separating knife 28 pushes against the counterpressure element 58 and thus through the films 70, 72; the deepest point of this penetration (in the drawings) is in the area of the center longitudinal plane 22. At the time of the first contact between the separating knife, the films, and the counterpressure element, there is as yet no pressure being exerted on the films in the area of the welding strips 24, 26. The round rubber forming the counterpressure element 58 can therefore be deformed relatively easily, and no significant amount of tensile force is exerted on the films clamped between the counterpressure element 58 and the separating knife 28.

As the counterpressure bar 50 and the welding bar 10 continue to move toward each other, the welding members 24, 26 begin to press the films 70, 72 against the counterpressure element 58. As a result of this applied pressure, the counterpressure element 58 becomes stiffer, especially in the area 102, 104 between the welding members 24, 26 and the separating knife 28. Simultaneously, there is a certain displacement of material (e.g., 106) of the counterpressure element 58 into the recesses 32, 34. This brings about a greater contact surface between the films 70, 72 and the welding members 24, 26. As can be seen in FIG. 2, it also means that the films 70, 72 pass out of contact with the welding members 24, 26 in a gentle or gradual transition, so that between the welding members 24, 26 and the separating knife 28, even during the welding process which now occurs, there are no significant changes in the amount of stress in the films 70, 72. The result of this is that the films separate with great reliability only in the area of the separating knife 28 and that cracks in the area of the seam or significant weakenings are avoided.

It thus can be seen that a plurality of films can be separated into sections having transverse 108 edges. The transverse edges of each section are welded into one edge. It should be recognized that the plastic films 70, 72 may suffer some elastic and inelastic deformation as the knife 28 pushes them against the element 58. Excessive deformation can produce increased film tension at the edge 30 of the knife 28 as well as in the vicinity of the welding members 24, 26. Therefore, it is important to control the film tension to avoid tears, rips or gaps, and in turn poor quality separation and poor seals. Limiting the height 98 (FIG. 2, not to scale) of the edge 30 with respect to the members 24, 26 minimizes tension in the films during separation as the welding members 24, 26 press and hold the films 70, 72 against the element 58. The pressing and holding action of the welding members 24, 26 substantially eliminates tensions being transmitted from outside the separating and welding area as from, for example, an unwinding supply roll of film. The rounded surfaces 25, 27 of the welding members 24, 26 interface with the element 58 so that the films come under a gradually increasing and distributed welding force relating to the resilience of the element 58. That is, the force exerted against the films is greater where the element 58 has suffered the greater compression, and less where there is less compression. As a result, the welding is effected while minimizing tears, gaps and other weld deformities.

Figure 4:
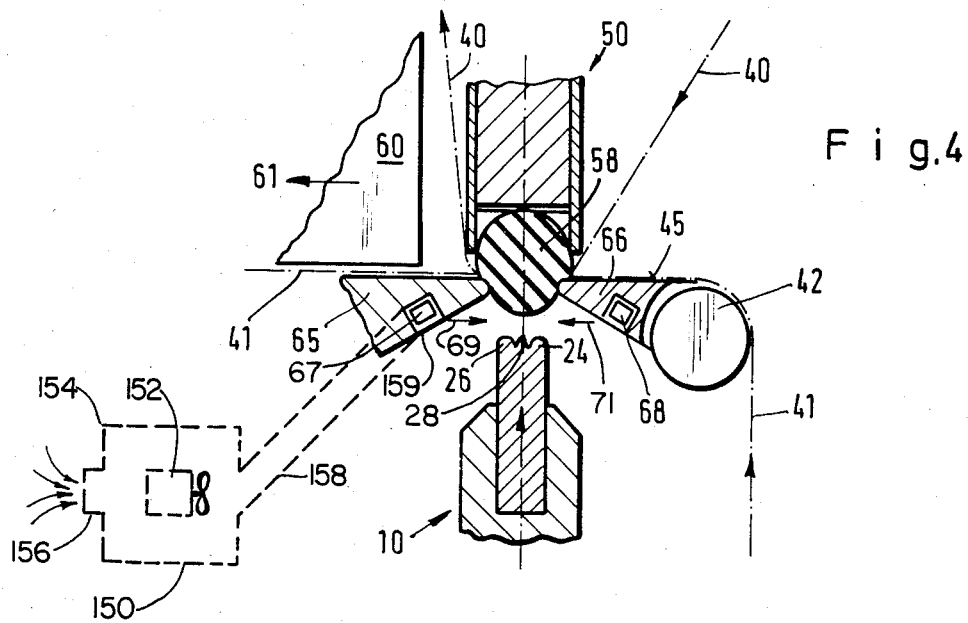
FIG. 4 shows the device depicted in FIG. 3, with the counterpressure element fully extended for welding.
Figure 5:
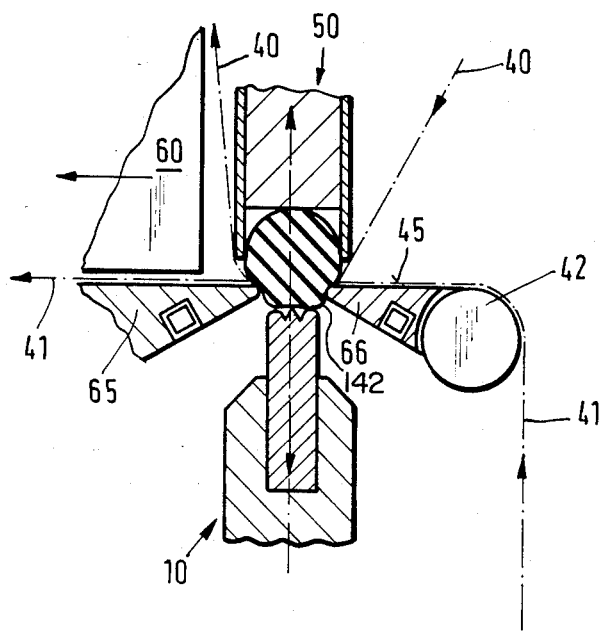
FIG. 5 continues the process depicted in FIG. 4, showing the welding bar pushed up against the counterpressure element.

The welding bar 10 and counterpressure bar 50, shown in FIGS. 3–5, are similar to that shown in FIGS. 1–2 and are therefore numbered the same. Description and operation of the welding bar 10 and counterpressure bar 50 of FIGS. 3–5 is substantially the same as shown and described with respect to FIGS. 1–2 except and as further discussed hereinafter.

Film tension in the weld region can be further reduced to further improve the quality of the separations and the welding by holding the films snugly or tightly on both sides of the welding bar 10. Stationary support bars 65 and 66 are positioned with respect to the bars 10 and 50 to hold the films in place and to further reduce tension, as more fully discussed hereinafter.

Referring to FIG. 3, an object 60 is enclosed in an upper film 40 and a lower film 41. The films 40 and 41 are supplied from unending rolls 120 and 122 and are pulled through the gap between welding bar 10 and counterpressure bar 50. In FIG. 3, the films are shown coming from the right and moving in the direction shown by arrow 61. They are pulled through the gap by means not here relevant and known to those skilled in the art. As soon as object 60 has passed the gap, counterpressure bar 50 descends behind object 60 as shown in FIG. 3. The various objects 60, 60A are carried to and from the welding station as part of an ongoing process on rollers 124 or belts or other means known to those skilled in the art. Transportation of the objects 60, 60A to and from the welding station is done using existing technology, and is not part of this invention. Existing technology is also responsible for placing each object 60 onto the lower film 41 before entering the welding station and as soon as the lower film passes over roller 42 to the transport plane 45, as also shown in FIG. 3. Lower film 41 is welded to upper film 40 at some point ahead of the next object 60A. Upper film 40 is typically drawn from the supply roll 120 by the movement of object 60. Upper film 40 therefore covers the front, top and back of object 60 in a manner known to those skilled in the art. However, lower film 41 covers only the lower portion of the objects 60, 60A.

When counterpressure bar 50 descends from its extreme upper position after object 60 passes through the gap, upper film 40 is pulled down substantially across the back of object 60 until the upper film 40 comes into contact with lower film 41. At that time, welding bar 10 moves to contact element 58 to weld the two films 40, 41 together with two parallel transverse weld seams and substantially simultaneously to separate the films 40, 41 between the two seams. Welding strip 26 makes the weld seam for object 60 depicted in FIG. 3, while the other welding strip 24 of the welding bar 10 makes the weld seam which precedes the following object 60A.

In FIGS. 1 and 2, when counterpressure bar 50 descends from its extreme up position (not shown) through a position similar to that shown in FIG. 3 and on down to the position similar to that shown in FIG. 4, it first creates tension in upper film 72 and then, after contact is made with lower film 70, creates tension in the latter. During high volume production, this tension can become significant, and may detract from the quality of the weld seam since the film softens during welding and the tension may therefore stretch the film substantially in the seam region.

This tension is largely eliminated during the welding sequence with the arrangement shown in FIGS. 3 through 5. For this purpose, support bar means is positioned with respect to the counterpressure element 58 so that upon movement toward said welding strip 20, the support bar means deform the counterpressure element 58 substantially along the outside transverse portion 130, 132.

In the embodiment of FIGS. 3—5, the support bar means is comprised of stationary support bars 65, 66 which are rigidly mounted to a machine framework (not shown) on both sides of longitudinal plane 22. The support bars 65, 66 have flat surfaces 134, 136 substantially parallel to the transport plane 45 of objects 60, 60A. In the illustrated embodiment of FIGS. 3-5, the surfaces 134, 136 are the transport surfaces in the transport plane 45. The adjacent ends 138, 140 of the two support bars 65, 66 are rounded, as clearly shown in the drawings, and are separated by a distance which is less than the diameter 100 of the counterpressure element 58, or the corresponding dimension of the counterpressure element which is not round.

As shown in FIG. 3, lower film 41 passes along transport plane 45 over the surface 136 of support bar 66 and, after crossing the welding gap, over the surface 134 of support bar 65. When counterpressure bar 50 descends as in FIGS. 3 and 4, it first brings the upper film 40 into contact with lower film 41. Thereafter the bar 50 presses itself against the adjacent edges of the support bars 65, 66. Since the counterpressure element 58 of counterpressure bar 50 is elastic, it distorts as shown in FIG. 4 as a result of the resistance force of the support bars 65, 66. Stacked films 40 and 41 are snugly held against the element 58 in the area of distortion, as may be seen from FIG. 4.

When welding bar 10 subsequently rises to its welding and separating position as shown in FIG. 5, thereby coming into contact with films 40 and 41. As the knife 28 and welding members 24, 26 pass against element 58, the element 58 undergoes additional distortion in that its lower surface is flattened. This reduces the distance along the surface of counterpressure element 58 between support bar 65 and support bar 66. That is, the cross sectional perimeter 142 is lessened as the element 58 is compressed. As a result, the tension in the now stack films 40, 41 between the two support bars 65, 66 is reduced or eliminated. The subsequent welding and separating sequence, as described with respect to FIGS. 1-2, then proceeds with little or no film tension.

As best seen in FIG. 3, welding bar 10 is mounted to means 190 for moving the bar 10 in a reciprocating fashion upward and downward. The means 190 may be mechanical, hydraulic or electrical. The bar 50 is also mounted to means 192 for moving the bar 50 in a reciprocating fashion downward and upward as denoted by the arrows 194. These means 192 may be mechanical, hydraulic or electrical. Those skilled in the art will recognize that the movement of the bars 10, 50 by means 190, 192 is timed to moved in accordance as herein described by electrical or mechanical means. For example, machines upon which the welding and separating apparatus herein disclosed may be used may be a packaging machine in which an electric motor powers drive belts and gears which are connected through levers and cause to act as the means 190, 192.

Since the welding and separating is facilitated by the use of heat, the plastic films are soft and susceptible to tearing or other deformation. Inadvertent tensioning of the films after separating and welding may also produce undesirable tears of deformation. Cooling of the films is desirable as well as cooling of structure in the vicinity of the films other than the knife 28 and welding members 24, 26.

A source of cooling material 150 is shown in phantom in FIG. 4 connected to means to direct cooling material into the welding and separating area. Any convenient or desired source of cooling material may be used. As here shown, the source is a fan 152 in a plenum 154 which has a filter 156. The fan supplies filtered air through a channel 158 to means for directing the air.

The two support bars 65 and 66 preferably have cooling channels 67 and 68 formed therein. Cooling air can flow through jets or other apertures 159 as shown by arrows 69 and 71 to cool the films and structure in the welding and separating region.

It is understood that counterpressure element 58 may take some other cross sectional form than the round form shown. It is only important to be sure that the width 100 of the element 58 is greater than the gap 101 between the opposing support bars 65, 66 and greater than the overall thickness 81 of the strip 20.

It should also be noted that the tension reducing or eliminating support bars 65, 66 may also be used in a device in which welding bar 10 cannot be raised and lowered as shown in FIGS. 3-5, but instead is fixed in a position similar to that shown in FIG. 5. In that case, the movement of counterpressure bar 50 and counterpressure element 58 alone would serve to press the films 40, 41 with sufficient force against support bars 65, 66 and welding bar 10 so that welding and separation occurs.

A particular advantage of the embodiment depicted in FIGS. 3-5 arises from the fact that it allows creation of so-called tight or stretched packaging which may eliminate the need for subsequent shrinking of the films in a heated tunnel. Tight packaging requires that upper and lower films 40 and 41 be pulled tightly around object 60. This can be achieved in this embodiment when the upper film 40 supply roll 120, located to the right of counterpressure bar 50 (see FIGS. 3-5), is braked against the descent of the counterpressure bar, allowing the desired amount of tension to be created. This tension will, of course, also exist initially in the contact zone between the upper film 40 and counterpressure element 58. Nevertheless, the tension existing in the films as they are stretched between the two support bars 65, 66 by descending counterpressure element 58 will be so greatly reduced by the subsequent deformation of the counterpressure element as it comes in contact with welding bar 10 that a qualitatively good welded seam will be created despite very high tension outside the welding and separating area.

FIG. 6 is a simplified top view of a packaging machine having the welding bar 10 and counterpressure bar 50 mounted under structure 160. Objects 162A and 162B are supplied from right to left by means of a conveyor and/or rollers 163, as known to those skilled in the art. An upper film 164 is supplied from a roll 166. The object 162B is shown in phantom as it is under the film 164. A lower film (not shown) is also supplied similar to that described in FIGS. 1-5. After welding and separating, as discussed and illustrated with respect to FIGS. 1-5, packaged objects 168A and 168B are transported away by known means. As shown in FIG. 6, the objects 168A and 168B each have a leading transverse welded edge 170A and 170B. They also have a trailing transverse welded edge 172A and 172B. As discussed with respect to FIGS. 1-5, the trailing edge 172B of one object 168B and the leading edge 170A of the following object 168A, in FIG. 6, are formed by separating the upper and lower films into sections to surround each object and by welding the transverse edges of the upper and lower films into the transverse edges 170A, 170B, 172A, 172B as shown. The outside edges 174, 176 of the films, in FIG. 6, may be sealed by means known in the art.

The invention herein disclosed is particularly suitable for use with a packaging machine. A model SW 84-40, manufactured by DOBOY VERPACKUNGSMASCHINEN GMBH of Hamburg, West Germany, is an example of a packaging machine into which the instant invention may be incorporated.

It should be appreciated that although the illustrated embodiment shows the use of two films which are stacked together, more than two films may be separated and welded following the principles of the instant invention.

It should be appreciated that welding of a plurality of films without separating or cutting them can be effected by practicing the principles of this invention. For both the embodiments of FIGS. 1-2 and FIGS. 3-5, the welding strip 20 can be replaced with a welding member 180 (FIG. 7) having a rounded surface 182 which extends between the two outside edges of the films to be welded. The member 180 has an axis 184 which is aligned in the plane 22. Operation of such apparatus is otherwise as described with respect to FIGS. 1-5. In particular, perimeter 142 of the element 58 will be reduced to minimize tension during the welding of the films.

It is also to be understood that the embodiments of the inventions disclosed are merely illustrative of the application of the principles of the invention. Reference herein to details or steps is not intended to limit the scope of the claims, which themselves recite those features regarded as essential to the invention.

I claim:

1. Apparatus for welding and separating stacked plastic films which have opposite side edges, said apparatus comprising:

a welding and separating strip positioned substantially normal to said stacked plastic films, said strip being formed to have a separating member and two welding members positioned proximate to and on opposite sides of said separating member, said separating member and two welding members extending between opposite side edges of said stacked plastic films, and said strip including means to heat said separating member and said two welding members;

a counterpressure element mounted to be opposite said separating member and two welding members with said stacked plastic films therebetween which element is formed of a resilient material to extend between opposite side edges of said stacked plastic films and which element is sized to contact said separating member and two welding members;

means to move said welding and separating strip and said counterpressure element selectively or together to press said separating member and two welding members against said counterpressure element to cuase preselected deformation thereof so that, with said stacked plastic films positioned between said separating member and two welding members and said counterpressure element, said separating member separates said stacked plastic films into sections having transverse edges and substantially simultaneously said two welding members weld the transverse edges of each section of said stacked plastic films into one transverse edge; and wherein said two welding members are sized and formed to contact said counterpressure element and hold said stacked plastic films substantially immobile thereagainst as said welding members are welding and as said separating member is separating.

2. The apparatus of claim 1 wherein said separating member is triangular in cross section to form an elongated wedge having a cutting edge extending normally toward said film, and wherein said two welding members are each arcuate in cross section to form convex surfaces for contact with said counterpressure element.

3. The apparatus of claim 2 wherein the two welding members and the wedge are positioned to form recesses therebetween.

4. The apparatus of claim 3 wherein each of two welding members has a thickness, and wherein the convex surfaces of the welding members are substantially round with a radius of about one-half the thickness of said respective welding member, and wherein said recesses are formed to be V-shaped by the surface of the wedge and the inward continuation of the exterior surface of each welding member, and wherein each V-shaped cavity extends inwardly into said strip to point at least as far as the center of curvature of the respective rounded surfaces of the welding members as measured from a plane which intersects the center of curvature and which is substantially normal to the direction of movement of the strip.

5. The apparatus of claim 4 wherein the counterpressure element is formed and sized so that said separating member forms a recess therein as said counterpressure element and said separating member are moved together and so that said two welding members are pressed against said counterpressure element proximate the recess in the recess formed therein by said separating member.

6. The apparatus of claim 5 wherein said counterpressure element is arcuate in cross section to form a convex surface for contact with said separating member and two welding members.

7. The apparatus of claim 6 wherein the counterpressure element convex surface is substantially round and wherein the counterpressure element is formed of material having a Shore hardness from about 20 to about 60.

8. The apparatus of claim 7 wherein the outward most point of the surface of the counterpressure element and the cutting edge are on a substantially vertical longitudinal plane.

9. The apparatus of claim 8 wherein the wedge angle of the separating member is about 30°, and wherein the wedge edge is slightly closer to the element.

10. The apparatus of claim 9 wherein the surface of the counterpressure element for contacting said strip, the two welding members and the wedge, except for the cutting edge area of the wedge, are coated with PTFE.

11. The apparatus of claims 1, 2, 3, 4, 5, 6, 7, 8, 9 or 10 wherein the means to move moves the counterpressure element towards said welding and separating strip, and further including support bar means positioned with respect to the counterpressure element so that, upon movement of the counterpressure element toward said strip, said support bar means deforms said counterpressure element substantially along its outside transverse portion.

12. The apparatus of claim 11 wherein the support bar means includes means connected to a source of cooling material, which means directs said cooling material into the separating and welding area of said apparatus for cooling said stacked plastic films.

13. The apparatus of claim 11 wherein said support bar means includes a pair of support bars which extend between opposite side edges of said stacked plastic films and which are positioned opposite each other between said strip and said counterpressure element.

14. The apparatus of claim 13 wherein each of said support bars have a substantially flat surface positioned substantially normal to the longitudinal plane for movement of at least one of said stacked plastic films there across and have rounded inward facing tips for holding said stacked plastic films against said counterpressure element as said counterpressure element moves into contact therewith and as said strip presses against said counterpressure element so that the effective cross sectional perimeter of said counterpressure element in contact with film is reduced to relieve tension in the films as they are separated and to relieve tension along the transverse edges of each section of said stacked plastic films.

15. The apparatus of claim 14 wherein the cooling means is comprised of at least one channel formed in a selected support bar connected to receive cooling air from said source, and a plurality of jets to direct said air against the film in the weld region.

16. For use in a packaging machine of the type to overwrap objects between two plastic films which have opposite side edges, wherein the objects move substantially in a plane and the films are delivered from unending rolls thereof and are pulled about the object by means, and wherein the films are stacked proximate each other for separating and for welding, apparatus for separating and welding comprising:

a welding and separating strip mounted to said machine and positioned substantially normal to said stacked plastic films and to extend transversely between opposite side edges of said films, said strip being formed to have a separating member and two welding members positioned proximate thereto and on opposite sides thereof, said separating member being formed to be a wedge in cross section with the point thereof oriented outwardly toward said films and slightly closer thereto than said welding members, and said welding members each being formed to have a thickness and a rounded surface in cross section which surface has a radius of about one-half the thickness of the respective welding member, and wherein the wedge and welding members are positioned to form a V-shaped groove therebetween the bottom of which is below the center of curvature of said rounded surfaces of said welding members, and said strip including means to heat said welding and separating members;

a counterpressure element mounted to said machine to be opposite said strip with said stacked plastic films therebetween, said element being formed of a resilient material and to have a rounded in cross section surface extending outwardly and toward said strip so that the maximum outwardly extending portion of said element is in substantial alignment with the point of said wedge in a vertical and transverse plane;

a pair of support bars mounted to said machine to be between said element and said strip, and having flat surfaces in substantial alignment for the transport of at least one of said films, said support bars being positioned so that each is in position to contact an outer longitudinal side of said element; and movement means to selectively move the strip, element and support bars with respect to each other or together so that said support bars each contact the outer longitudinal side of said element, so that said wedge thereafter deforms the element and with said films between said element and said support bars, separates the films into sections each having transverse edges, and substantially simultaneously said welding members press the films against the element and weld the transverse edges of each respective section together into one edge, said element having a reduced cross sectional perimeter at the time of separating and welding due to the deformation thereof by said separating member and said support bars.

17. Apparatus of claim 16 wherein said machine includes a source of cooling fluid and wherein at least one of said support bars has a channel formed therein connected to receive said cooling fluid and has means to direct said fluid toward the films in the welding area.

18. The apparatus of claim 17 wherein said welding members' rounded surfaces are of substantially the same dimension and extend upwardly to be substantially tangent to a welding plane normal to said longitudinal plane and wherein said wedge point extends slightly above said welding plane.

19. A method for welding stacked plastic films having two opposite side edges, said method comprising:
positioning a heated welding bar and a resilient counterpressure element substantially opposite each other to form a gap therebetween;
feeding the stacked plastic films through said gap;
holding the stacked plastic films tightly against said element along two lines extending between the opposite side edges of said films to form in cross section a convex-like arc between said two lines with resilient material of said element and to place said films under tension between said two lines;
moving the welding bar and said element relative to each other for the welding bar to contact the element between the two lines and pressing the welding bar and said element together to reduce the cross sectional perimeter between the two lines while welding said films.

20. A packaging machine for wrapping objects with plastic film comprising:
a supply of first plastic film having opposite side edges;
a supply of second plastic film having opposite side edges;
means to supply objects for wrapping the objects between said first and second films and to stack said films for welding and separating;
means to weld and separate said stacked plastic films having
a welding and separating strip positioned substantially normal to said stacked plastic films, said strip being formed to have a separating member and two welding members positioned proximate to and on opposite sides of said separating member, said separating member and two welding members extending between opposite side edges of said stacked plastic films, and said strip including means to heat said separating member and said two welding members,
a counterpressure element mounted to be opposite said separating member and two welding members with said stacked plastic films therebetween which element is formed of a resilient material to extend between opposite side edges of said stacked plastic films and which element is sized to contact said separating member and two welding members,
means to move said welding and separating strip and said counterpressure element selectively or together to press said separating member and two welding members against said counterpressure element to cause preselected deformation thereof so that, with said stacked plastic films positioned between said separating member and two welding members and said counterpressure element, said separating member separates said stacked plastic films into sections having transverse edges and substantially simultaneously said two welding members weld the transverse edges of each section of said stacked plastic films into one transverse edge, and
wherein said two welding members are sized and formed to contact said counterpressure element and hold said stacked plastic films substantially immobile thereagainst as said welding members are welding and as said separating member is separating; and
means to transport wrapped objects away.

21. A method for welding and separating stacked plastic films having two opposite side edges, said method comprising:
positioning a heated welding and separating bar substantially opposite a resilient counterpressure element to form a gap therebetween, said bar having a separating member positioned between two welding members;
feeding plastic films through said gap and stacking said films therein;
holding the stacked plastic films tightly against said element along two lines extending between the opposite side edges of said films to form in cross section a convex-like arc with resilient material between said two lines and to place said films under tension between said two lines;
moving the welding and separating bar and said element relative to each other for the separating member to first press the films against the element and the welding members to thereafter press the films against the element all between said two lines to reduce the cross sectional perimeter between the two lines and the tension in the films while separating the films and welding the edges of the films formed by the separation.

* * * * *